US011530325B2

(12) United States Patent
Foley et al.

(10) Patent No.: US 11,530,325 B2
(45) **Date of Patent: *Dec. 20, 2022**

(54) ELECTROMAGNETIC RADIATION MITIGATION IN COATINGS WITH SPHERICAL PARTICLES

(71) Applicant: BASF SE, Ludwigshafen am Rhein (DE)

(72) Inventors: Nicholas A. Foley, Charlotte, NC (US); Christopher J. Valovic, Charlotte, NC (US); Jack Royce Johnson, Charlotte, NC (US); Brandon C. Achord, Charlotte, NC (US); Jeremy J. Funk, Charlotte, NC (US); Rupa Hiremath Darji, Tarrytown, NY (US)

(73) Assignee: BASF SE, Ludwigshafen am Rhein (DE)

( * ) Notice: Subject to any disclaimer, the term of this patent is extended or adjusted under 35 U.S.C. 154(b) by 95 days.

This patent is subject to a terminal disclaimer.

(21) Appl. No.: 16/817,173

(22) Filed: Mar. 12, 2020

(65) Prior Publication Data

US 2020/0291241 A1 Sep. 17, 2020

Related U.S. Application Data

(60) Provisional application No. 62/817,259, filed on Mar. 12, 2019.

(51) Int. Cl.

| | |
|---|---|
| ***C09D 5/00*** | (2006.01) |
| ***C09D 7/61*** | (2018.01) |
| ***C08K 7/24*** | (2006.01) |
| ***C09D 7/40*** | (2018.01) |
| ***C09D 7/63*** | (2018.01) |
| ***C09D 7/65*** | (2018.01) |
| ***C08J 9/32*** | (2006.01) |
| ***C08K 7/22*** | (2006.01) |

(52) U.S. Cl.
CPC *C09D 5/00* (2013.01); *C08J 9/32* (2013.01); *C08K 7/22* (2013.01); *C08K 7/24* (2013.01); *C09D 7/61* (2018.01); *C09D 7/63* (2018.01); *C09D 7/65* (2018.01); *C09D 7/69* (2018.01); *C09D 7/70* (2018.01); *C08K 2201/005* (2013.01)

(58) Field of Classification Search
CPC .................................. C09D 7/61; C08K 7/24
See application file for complete search history.

(56) References Cited

U.S. PATENT DOCUMENTS 4,591,533 A * 5/1986 Antonelli ........... C09D 133/068 427/407.1
5,342,876 A * 8/1994 Abe ..................... B41M 5/5218 524/493
2018/0186951 A1* 7/2018 Kalyanaraman ........... C08J 5/04
2019/0076809 A1 3/2019 Darji et al.
2019/0076810 A1 3/2019 Darji et al.
2020/0291250 A1* 9/2020 Foley ........................ C08J 9/32

FOREIGN PATENT DOCUMENTS

JP 01139656 A * 6/1989
WO 2019/051353 A1 3/2019
WO 2019/051357 A1 3/2019

* cited by examiner

*Primary Examiner* — Vickey Nerangis
(74) *Attorney, Agent, or Firm* — Faegre Drinker Biddle & Reath LLP

(57) ABSTRACT

Coating compositions comprising a polymer binder and a sphere selected from porous metal oxide spheres formed from metal oxide particles and having, e.g., an average porosity of from 0.10 to 0.90; polymer spheres formed from a multimodal distribution of polymer particles; or mixtures thereof, are described herein. The sphere enhances the reflective characteristics of the coating compositions with respect to electromagnetic radiation. In particular, the coating compositions when dried, can exhibit UV reflectance, visible light reflectance, IR reflectance, or a combination thereof.

13 Claims, No Drawings

ELECTROMAGNETIC RADIATION MITIGATION IN COATINGS WITH SPHERICAL PARTICLES

CROSS REFERENCE TO RELATED APPLICATIONS

This application claims priority to U.S. Provisional Patent Application No. 62/817,259, entitled "Electromagnetic Radiation Mitigation in Coatings with Spherical Particles," filed Mar. 12, 2019, the content of which is herein incorporated by reference in its entirety.

FIELD OF THE DISCLOSURE

The present disclosure relates to coating compositions, particularly to coating compositions comprising reflective spheres.

BACKGROUND

One important requirement for conservation of coatings is their protection from damage caused by environmental conditions. A primary environmental concern is radiation including ultraviolet (UV), visible, and infrared (IR) radiation. Molecules of all types are excited by and selectively absorb energy from radiation at specific wavelengths across the electromagnetic spectrum. For example, most organic polymers used in coatings are excited by and absorb radiation at a variety of specific wavelengths in the IR and UV regions of the electromagnetic spectrum. While the exact nature of the changes will depend upon the organic polymer structure, the net effect of radiation is a marked change (deterioration) in physical, chemical, and performance properties of the coatings. Heat is also a direct consequence of either visible or infrared radiation incident on coatings.

Coatings having various functionalities, specifically how they interact with natural electromagnetic radiation, is commonly adopted in the coating industry. Coatings are designed to reflect or absorb certain wavelengths of incident radiation, depending upon the application. Currently, a wide range of technologies exists to help mitigate these various incident wavelengths of radiation. However, there is still a need for coatings with improved electromagnetic radiation mitigation effects. The compositions and methods described herein address these and other needs.

SUMMARY OF THE DISCLOSURE

Coating compositions comprising a polymer binder and a sphere (e.g., microsphere) selected from porous metal oxide spheres (e.g., microspheres) formed from metal oxide particles (e.g., nanoparticles) and having an average porosity of from 0.10 or 0.30 to 0.80 or 0.90; polymer spheres (e.g., microspheres) formed from a multimodal distribution of polymer particles (e.g., nanoparticles); or mixtures thereof, are described herein. The sphere can have an average particle size diameter of 100 microns or less, or from 1 micron to 100 microns. The problem solved with the use of the sphere includes enhancement of the reflective characteristics of the coating compositions with respect to electromagnetic radiation. In particular, the coating compositions when dried, can exhibit UV reflectance within a wavelength from 100 nm to 400 nm, visible light reflectance within a wavelength of from 400 to 700 nm, IR reflectance within a wavelength from 800 nm to 10 μm, or a combination thereof. The compositions may also exhibit improved opacity within a wavelength from 100 nm to 800 nm. In some instances, the coating compositions can be an aqueous composition.

The polymer binder present in the coating compositions can comprise a polymer selected from acrylic homopolymers, styrene-acrylic-based copolymers, styrene-butadiene-based copolymers, styrene-butadiene-styrene block copolymers, vinyl acrylic-based copolymers, ethylene vinyl acetate-based copolymers, polychloroprene, alkyd resin, polyester resins, polyurethane resins, silicone resins, petroleum resins, epoxy resins, or blends thereof. The polymer binder can be present in an amount of from greater than 0% to 99.9% by weight, or from 5% to 99.9% by weight, or from 10% to 95% by weight, based on a dry weight of the coating composition.

As described herein, the sphere in the coating compositions can be selected from porous metal oxide spheres, polymer spheres, or mixtures thereof. In some examples, the coating compositions comprise the porous metal oxide spheres. The porous metal oxide spheres can have an average porosity from 0.10 to 0.80 or 0.90, from 0.20 to 0.70, from 0.40 to about 0.65, or from 0.45 to about 0.55. The porous metal oxide spheres can have a multimodal distribution of pore sizes, such as a bimodal distribution of pore sizes. The average pore diameter of the porous metal oxide spheres can be from 50 nm to 10 μm, from 50 nm to 5 μm, from 50 nm to 2.5 μm, or from 50 nm to 1 μm. The porous metal oxide spheres comprise from 60% to 99.9% by weight metal oxide, based on a total weight of the porous metal oxide spheres. The metal oxide can be selected from the group consisting of silica, titania, alumina, zirconia, ceria, iron oxides, zinc oxide, chromium oxide and combinations thereof, such as titania or silica.

In other examples, the coating compositions comprise the polymer spheres. The polymer spheres are formed from a polymodal, such as a bimodal distribution of polymer particles. The polymer spheres can comprise a polymer selected from the group consisting of poly(meth)acrylic acid, poly(meth)acrylates, polystyrenes, polyacrylamides, polyethylene, polypropylene, polylactic acid, polyacrylonitrile, blends thereof, salts thereof, and copolymers thereof.

The coating compositions can further comprise one or more pigments or fillers, for example, pigments or fillers selected from clay, kaolin, mica, titanium dioxide, talc, natural silica, synthetic silica, natural silicates, synthetic silicates, feldspars, nepheline syenite, wollastonite, diatomite, barite, glass, and calcium carbonate, bentonite, attapulgite, zeolite, or mixtures thereof. The one or more pigments or fillers can be present in an amount such that the sphere and one or more pigments or fillers make up from greater than 0% to 90% by weight, or from 0.1% to 60% by weight, based on a total weight of the coating composition.

The coating compositions can further include a pigment dispersant, an inorganic or organic filler, a pigment extender, an adhesion enhancer, a film forming aid, a defoamer, a thickener, a light stabilizer, a wetting agent, a biocide, a tackifier, or a combination thereof.

In specific examples, the coating compositions can be UV reflective composition, such as clear coating compositions. Clear coating compositions comprising a polymer selected from acrylic homopolymers, styrene-acrylic-based copolymers, styrene-butadiene-based copolymers, styrene-butadiene-styrene copolymers, vinyl acrylic copolymers, ethylene vinyl acetate copolymers, polychloroprene, blends thereof, or copolymers thereof; and a sphere comprising porous metal oxide spheres formed from metal oxide particles, wherein the sphere has an average particle size diameter of from 1 micron to 10 microns, from 1 micron to 5 microns, or from 1 micron to 3 microns, and wherein the clear coating composition when dried exhibits a UV reflectance at a wavelength range from 100 nm to 400 nm, are disclosed herein. In certain embodiments, the UV reflective compositions comprise porous metal oxide spheres having an average diameter of from 1 micron to 10 microns, from 1 micron to 5 microns, or from 1 micron to 3 microns; an average porosity of from 0.20 to 0.70 or from 0.45 to 0.55; and an average pore diameter of from 50 nm to 400 nm or from 50 nm to 200 nm. The UV reflective compositions can further comprise one or more UV absorbers, such as those selected from a hydroxy-phenyl-benzotriaziole, a hydroxy-phenyl-triazine, a hydroxyl-benzophenone, an oxanilide, a cyanoacrylate, a malonate, and a mixture thereof.

In other specific examples, the coating compositions exhibits improved opacity, such as when incorporated in paints. Paint compositions comprising a polymer selected from acrylic homopolymers, styrene-acrylic-based copolymers, styrene-butadiene-based copolymers, styrene-butadiene-styrene copolymers, vinyl acrylic copolymers, ethylene vinyl acetate copolymers, polychloroprene, blends thereof, or copolymers thereof; and a sphere selected from porous metal oxide spheres formed from metal oxide particles, polymer spheres formed from a multimodal distribution of polymer particles, or a mixture thereof, wherein the sphere has an average particle size diameter of, e.g., 100 microns or less, from 1 micron to 100 microns, or from 1 micron to 10 microns, and an average porosity of from 0.40 to 0.65 or from 0.45 to 0.55, are disclosed herein. In certain embodiments, the coating compositions exhibiting improved opacity comprise porous metal oxide spheres having an average diameter of from 1 micron to 100 microns or from 1 micron to 10 microns; an average porosity of from 0.20 to 0.70, or from 0.45 to 0.55; and an average pore diameter of from 50 nm to 800 nm, from 50 nm to 400 nm, or from 100 nm to 200 nm. A wet film having a thickness of 75 μm and formed from the coating compositions exhibiting improved opacity such as paint compositions can exhibit a light scattering coefficient of greater than 1 S/mil, or greater than 3 S/mil, and an absorption coefficient of less than 0.02 K, as determined according to BS EN ISO 6504-1. The film can exhibit a contrast ratio of at least 90% or greater than 96%. Compositions having improved opacity can be selected from an aqueous based paint or an oil based paint or selected from an industrial paint or an architectural paint for interior and exterior applications.

In further specific examples, the coating compositions can be IR reflective coating composition. IR reflective coating composition comprising a polymer selected from acrylic homopolymers, styrene-acrylic-based copolymers, styrene-butadiene-based copolymers, styrene-butadiene-styrene copolymers, vinyl acrylic copolymers, ethylene vinyl acetate copolymers, polychloroprene, alkyd resin, polyester resins, polyurethane resins, silicone resins, petroleum resins, epoxy resins, blends thereof, or copolymers thereof; and a sphere selected from porous metal oxide spheres formed from metal oxide particles, polymer spheres formed from a multimodal distribution of polymer particles, or a mixture thereof, wherein the sphere has, e.g., an average particle size diameter of 5 microns or greater or from 5 microns to 100 microns and an average porosity of from 0.40 to 0.65 or from 0.45 to 0.55, and wherein the coating composition when dried exhibits an IR reflectance at a wavelength range from, e.g., 800 nm to 10 microns, from 800 nm to 2.5 microns, or from 800 nm to 1 micron, are disclosed herein. In certain embodiments, the IR reflective coating compositions comprise porous metal oxide spheres having an average diameter of from greater than 5 microns to 100 microns; an average porosity of from 0.20 to 0.70 or from 0.45 to 0.55; and an average pore diameter of from 400 nm to 5 microns, from 400 nm to 2.5 microns, or from 400 nm to 1 micron.

Coatings and films formed from the coating compositions are also disclosed. The coating compositions can be in the form of an ink or an architectural coating, such as a paint. The films can have a thickness of from 0.5 to 500 microns, or a thickness of from 5 to 75 microns, or from 0.5 to 30 microns, after drying. In certain embodiments, the films can exhibit a UV reflectance at a wavelength from 100 nm to 400 nm of at least 10%, at least 20%, at least 40%, or at least 50%. In other embodiments, the films can exhibit an IR reflectance at a wavelength from 800 nm to 10 μm, from 800 nm to 5 μm, from 800 nm to 2.5 μm, or from 800 nm to 1 μm, of at least 10%, at least 20%, at least 40%, or at least 50%. In further embodiments, the films having a thickness of 75 microns, exhibit a contrast ratio of at least 90% or at least 96%.

Methods of protecting a substrate against UV-radiation or IR-radiation comprising applying a coating composition disclosed herein are also provided. The substrate can be an architectural structure, glass, metal, wood, plastic, concrete, vinyl, ceramic material or another coating layer applied on such a substrate.

The details of one or more embodiments are set forth in the description below. Other features, objects, and advantages will be apparent from the description and from the claims.

DETAILED DESCRIPTION

This disclosure is based on the discovery that the physical characteristics of spheres (e.g., microspheres) selected from porous spheres (also referred to herein as porous metal oxide spheres) formed from metal oxide particles (e.g., nanoparticles), polymer spheres (e.g., microspheres) formed from a multimodal distribution of polymer particles (e.g., nanoparticles), or mixtures thereof can be tuned to enhance performance properties of coating compositions. The terms "tuned," "adjusted," and "configured" can be used interchangeably and refer to an adjustment to a physical and/or chemical characteristic of the spheres to change the reflectance properties of the spheres. By way of example, and not to be considered limiting, such physical characteristics that can be adjusted include the spheres' particle size diameter, particle size distribution, particle shape, the void (pore) diameter within the spheres, porosity, packing density, surface texture, and the degree of order with regards to the spatial arrangement of the voids (pores) in the spheres. Chemical characteristics that can be adjusted include the chemical make-up of the spheres. When used in coating compositions, the spheres can be added in a sufficient amount to enhance reflective properties and optionally replace existing components such as pigments and/or fillers in the coating compositions.

"Coating compositions" as used herein is a generic term for surface coatings and refers to compositions that include a vehicle containing a polymer binder component and a pigment or filler dispersed into the vehicle. The coating compositions described herein can include an aqueous or non-aqueous vehicle; a polymer binder; a sphere selected from porous metal oxide spheres, polymer spheres, or combinations thereof; and optionally one or more pigments or fillers. The coating compositions when dried, exhibit UV reflectance, visible light reflectance, IR reflectance, or a combination thereof. Preferably, the dried coating compositions exhibit a UV, visible, or IR reflectance of at least 10%, 20% or greater, 30% or greater, 40% or greater, or 50% or greater. Reflectance or reflectivity is expressed in terms of percentage of incident light that is scattered or reflected away from a surface.

In certain embodiments, the coating compositions comprising the spheres disclosed herein provide UV absorption functionality. The coating compositions can be coated on or incorporated into a substrate. The substrate can include, e.g., plastics, wood, fibers or fabrics, ceramics, glass, metals, and composite products thereof.

Polymer Binder

As described herein, the coating compositions include a polymer binder and sphere. The term "binder" (which also may be referred to interchangeably as "resin") refers to polymers that are included in the coating composition and that augment or participate in film formation and in the composition of the resultant film.

The specific polymer in the polymer binder can depend on the application of the coating compositions as well as other components of the coating compositions, such as an aqueous or non-aqueous vehicle. In some embodiments, the polymer binder can include a polymer selected from acrylic homopolymers (i.e., a polymer derived from one or more acrylic monomers), styrene-acrylic-based copolymers (i.e., a polymer derived from styrene and one or more (meth)acrylic monomers), styrene-butadiene-based copolymers (i.e., a polymer derived from styrene and one or more diene monomers such as 1,2-butadiene, 1,3-butadiene, 2-methyl-1,3-butadiene, or 2-chloro-1,3-butadiene), styrene-butadiene-styrene block copolymers, vinyl acrylic-based copolymers (i.e., a polymer derived from one or more vinyl ester monomers and one or more (meth)acrylic monomers), ethylene vinyl acetate-based copolymers (i.e., a polymer derived from ethylene and vinyl acetate), a vinyl chloride-based polymer (i.e., a polymer derived from one or more vinyl chloride monomers such as polyvinyl chloride), polychloroprene (i.e., a polymer derived from chlorinated diene monomers), a vinyl alkanoate-based polymer (i.e., a polymer derived from one or more vinyl alkanoate monomers, such as polyvinyl acetate or a copolymer derived from ethylene and vinyl acetate monomers), alkyd resin, polyester resin, polyurethane resin, an acrylic-polyurethane hybrid polymer, silicone resin, petroleum resin, epoxy resin, or blends thereof.

In certain embodiments, the polymer (e.g., an acrylic homopolymer or a styrene-acrylic based copolymer) in the polymer is derived from one or more (meth)acrylate and/or (meth)acrylic acid monomers. The term "(meth)acryl . . . ," as used herein, includes acryl . . . , methacryl . . . , and also includes diacryl . . . , dimethacryl . . . polyacryl . . . and polymethacryl . . . or mixtures thereof. For example, the term "(meth)acrylate monomer" includes acrylate and methacrylate monomers, diacrylate and dimethacrylate monomers, and other polyacrylate and polymethacrylate monomers. Suitable (meth)acrylate monomers include esters of α,β-monoethylenically unsaturated mono- and dicarboxylic acids having 3 to 6 carbon atoms with alkanols having 1 to 12 carbon atoms (e.g. esters of acrylic acid, methacrylic acid, maleic acid, fumaric acid, or itaconic acid, with $C_1$-$C_{12}$, $C_1$-$C_8$, or $C_1$-$C_4$ alkanols such as ethyl, n-butyl, isobutyl and 2-ethylhexyl acrylates and methacrylates, dimethyl maleate and n-butyl maleate). Specific examples of suitable (meth)acrylate monomers for use in the polymer binder include methyl (meth)acrylate, ethyl (meth)acrylate, n-butyl (meth)acrylate, iso-butyl (meth)acrylate, tert-butyl (meth)acrylate, isobutyl (meth)acrylate, n-hexyl (meth)acrylate, 2-ethylhexyl (meth)acrylate, n-heptyl (meth)acrylate, 2-methylheptyl (meth)acrylate, octyl (meth)acrylate, isooctyl (meth)acrylate, n-nonyl (meth)acrylate, isononyl (meth) acrylate, n-decyl (meth)acrylate, isodecyl (meth)acrylate, dodecyl (meth)acrylate, heptadecyl (meth)acrylate, lauryl (meth)acrylate, tridecyl (meth)acrylate, stearyl (meth)acrylate, glycidyl (meth)acrylate, allyl (meth)acrylate, tetrahydrofurfuryl (meth)acrylate, cyclohexyl (meth)acrylate, 2-propylheptyl (meth)acrylate, behenyl (meth)acrylate, or combinations thereof. Other suitable (meth)acrylate monomers include alkyl crotonates, acetoacetoxyethyl (meth) acrylate, acetoacetoxypropyl (meth)acrylate, hydroxyethyl (meth)acrylate, 2-ethoxyethyl (meth)acrylate, 2-methoxy (meth)acrylate, 2-(2-ethoxyethoxy)ethyl (meth)acrylate, 2-phenoxyethyl (meth)acrylate, caprolactone (meth)acrylate, polypropyleneglycol mono(meth)acrylate, polyethyleneglycol (meth)acrylate, benzyl (meth)acrylate, 2,3-di(acetoacetoxy)propyl (meth)acrylate, hydroxypropyl (meth) acrylate, methylpolyglycol (meth)acrylate, 3,4-epoxycyclohexylmethyl (meth)acrylate, 1,6 hexanediol di(meth)acrylate, 1,4 butanediol di(meth)acrylate, or combinations thereof.

The polymer in the polymer binder can include a (meth) acrylate monomer in an amount of 5% or greater by weight, based on the weight of the polymer. For example, the (meth)acrylate monomer can be in an amount of 7% or greater, 10% or greater, 20% or greater, 30% or greater, 40% or greater, 50% or greater, 60% or greater, 65% or greater, 70% or greater, 75% or greater, 80% or greater, 85% or greater, 90% or greater, 95% or greater, or up to 100% by weight, based on the weight of the polymer. In some embodiments, the (meth)acrylate monomer can be in an amount of 100% or less, 95% or less, 90% or less, 85% or less, 80% or less, 75% or less, 70% or less, 65% or less, 60% or less, 55% or less, 50% or less, 45% or less, 40% or less, 35% or less, 30% or less, or 25% or less, by weight, based on the weight of the polymer. The polymer can be derived from any of the minimum values to any of the maximum values by weight described above of the (meth)acrylate monomers. For example, the (meth)acrylate monomer can be in an amount of from greater than 0% to 100%, 20% to 100%, 40% to 95%, 50% to 95%, 65% to 95%, or 65% to 85% by weight, based on the weight of the polymer.

In certain embodiments, the polymer in the polymer binder can be derived from (meth)acrylic acid monomers. Examples of suitable (meth)acrylic acid monomers include α,β-monoethylenically unsaturated mono- and dicarboxylic acids having 3 to 6 carbon atoms. Specific examples of suitable (meth)acrylic acid monomers include acrylic acid, methacrylic acid, maleic acid, fumaric acid, or itaconic acid, crotonic acid, dimethacrylic acid, ethylacrylic acid, allylacetic acid, vinylacetic acid, mesaconic acid, methylenemalonic acid, citraconic acid, or mixtures thereof. The polymer can be derived from 0%, 0.5% or greater, 1.0% or greater, 1.5% or greater, 2.5% or greater, 3.0% or greater, 3.5% or greater, 4.0% or greater, or 5.0% or greater, by weight of a (meth)acrylic acid monomer. In some embodiments, the polymer can be derived 25% or less, 20% or less, 15% or less, or 10% or less, by weight of a (meth)acrylic acid monomer. In some embodiments, the polymer can be derived from 0.5%-25%, from 0.5%-10%, from 1.0%-9%, from 2.0%-8% or from 0.5%-5%, by weight of a monomer.

In certain embodiments, the polymer in the polymer binder includes vinyl aromatic monomers (e.g., styrene). For example, the polymer binder can include a styrene-acrylic-based copolymer, a styrene-butadiene-based copolymer, a styrene-butadiene-styrene block copolymer, or a mixture thereof. Suitable vinyl aromatic monomers for use in the copolymers can include styrene or an alkyl styrene such as α- and p-methylstyrene, α-butylstyrene, p-n-butylstyrene, p-n-decylstyrene, vinyltoluene, and combinations thereof. The vinyl aromatic monomer can be present in an amount of 0% by weight or greater (e.g., 1% or greater, 2% or greater, 5% or greater, 10% or greater, 15% or greater, 20% or greater, 25% or greater, 30% or greater, 40% or greater, 50% or greater, 60% or greater, 65% or greater, 70% or greater, 75% or greater, 80% or greater, or 85% or greater by weight), based on the total weight of monomers from which the polymer is derived. In some embodiments, the vinyl aromatic monomer can be present in the polymer in an amount of 90% by weight or less (e.g., 85% or less, 80% or less, 75% or less, 70% or less, 65% or less, 60% or less, 55% or less, 50% or less, 45% or less, 40% or less, 35% or less, 30% or less, 25% or less, 15% or less, or 10% or less by weight), based on the total weight of monomers from which the polymer is derived. The polymer can be derived from any of the minimum values to any of the maximum values by weight described above of the vinyl aromatic monomer. For example, the polymer can be derived from 0% to 90% by weight (e.g., from 0% to 60%, from 0% to 45%, from 2% to 85%, from 2% to 60%, from 2% to 40%, from 5% to 85%, from 5% to 75%, from 5% to 60%, from 5% to 50%, from 5% to 35%, from 0% to 15%, from 0% to 10%, from 2% to 10%, or from 0% to 5% by weight of vinyl aromatic monomer), based on the total weight of monomers from which the polymer is derived.

When used, the styrene-acrylic-based copolymer can include styrene, a (meth)acrylate monomer, and optionally, one or more additional monomers. In some embodiments, the weight ratio of styrene to the (meth)acrylate monomer in the polymer can be from 1:99 to 99:1, from 10:99 to 99:10, from 5:95 to 95:5, from 5:95 to 80:20, from 20:80 to 80:20, from 5:95 to 70:30, from 30:70 to 70:30, or from 40:60 to 60:40. For example, the weight ratio of styrene to the (meth)acrylate monomer can be 25:75 or greater, 30:70 or greater, 35:65 or greater, or 40:60 or greater. In some examples, the polymer can be a random copolymer, such as a random styrene-(meth)acrylate copolymer.

In certain embodiments, the polymer in the polymer binder can be derived from one or more ethylenically-unsaturated monomers selected from anhydrides of α,β-monoethylenically unsaturated mono- and dicarboxylic acids (e.g. maleic anhydride, itaconic anhydride, and methylmalonic anhydride); acrylamides and alkyl-substituted acrylamides (e.g. (meth)acrylamide, N-tert-butylacrylamide, and N-methyl(meth)acrylamide); (meth)acrylonitrile; 1,2-butadiene (i.e. butadiene); vinyl and vinylidene halides (e.g. vinyl chloride and vinylidene chloride); vinyl esters of $C_1$-$C_{18}$ mono- or dicarboxylic acids (e.g. vinyl acetate, vinyl propionate, vinyl n-butyrate, vinyl laurate and vinyl stearate); $C_1$-$C_4$ hydroxyalkyl esters of $C_3$-$C_6$ mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with $C_1$-$C_{18}$ alcohols alkoxylated with from 2 to 50 mole of ethylene oxide, propylene oxide, butylene oxide or mixtures thereof (e.g. hydroxyethyl (meth)acrylate, hydroxypropyl (meth) acrylate, and methylpolyglycol acrylate); monomers containing glycidyl groups (e.g. glycidyl methacrylate); linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-N-butylamino)ethyl vinyl ether, methyldiglycol vinyl ether, and the corresponding allyl ethers); sulfo-functional monomers (e.g., allylsulfonic acid, methallylsulfonic acid, styrenesulfonate, vinylsulfonic acid, allyloxybenzenesulfonic acid, 2-acrylamido-2-methylpropanesulfonic acid, and their corresponding alkali metal or ammonium salts, sulfopropyl acrylate, and sulfopropyl methacrylate); vinylphosphonic acid, dimethyl vinylphosphonate, and other phosphorus monomers (e.g., phosphoethyl (meth)acrylate); alkylaminoalkyl (meth)acrylates or alkylaminoalkyl(meth)acrylamides or quaternization products thereof (e.g., 2(N,N-dimethylamino)ethyl (meth)acrylate, 3-(N,N-dimethylamino)propyl (meth)acrylate, 2-(N,N,N-trimethylammonium)ethyl (meth) acrylate chloride, 2-dimethylaminoethyl(meth)acrylamide, 3-dimethylaminopropyl(meth)acrylamide, and 3-trimethylammoniumpropyl(meth)acrylamide chloride); allyl esters of $C_1$-$C_{30}$ monocarboxylic acids; N-vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine); monomers containing 1,3-diketo groups (e.g., acetoacetoxyethyl (meth)acrylate or diacetone acrylamide); monomers containing urea groups (e.g., ureidoethyl (meth)acrylate, acrylamidoglycolic acid, and methacrylamidoglycolate methyl ether); monoalkyl itaconates; monoalkyl maleates; hydrophobic branched ester monomers; monomers containing silyl groups (e.g., trimethoxysilylpropyl methacrylate), vinyl esters of branched mono-carboxylic acids having a total of 8 to 12 carbon atoms in the acid residue moiety and 10 to 14 total carbon atoms such as, vinyl 2-ethylhexanoate, vinyl neo-nonanoate, vinyl neo-decanoate, vinyl neo-undecanoate, vinyl neo-dodecanoate and mixtures thereof, and copolymerizable surfactant monomers (e.g., those sold under the trademark ADEKA REASOAP).

The polymer in the polymer binder can include one or more crosslinking monomers. Exemplary crosslinking monomers include N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glycidyl (meth)acrylate; glyoxal based crosslinkers; monomers containing two vinyl radicals; monomers containing two vinylidene radicals; and monomers containing two alkenyl radicals. Other crosslinking monomers include, for instance, diesters of dihydric alcohols with α,β-monoethylenically unsaturated monocarboxylic acids, of which in turn acrylic acid and methacrylic acid can be employed. Examples of such monomers containing two non-conjugated ethylenically unsaturated double bonds can include alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate, methylenebisacrylamide, and mixtures thereof. In some embodiments, the polymer can include from 0.01% to 5% by weight of the polymer, of the crosslinking agent.

The polymer can have a glass-transition temperature ($T_g$), as measured by differential scanning calorimetry (DSC) using the mid-point temperature as described, for example, in ASTM 3418/82, of from −90° C. to 100° C. In some embodiments, the polymer has a measured $T_g$ of −90° C. or greater (for example, −80° C. or greater, −70° C. or greater, −60° C. or greater, −50° C. or greater, −40° C. or greater, −30° C. or greater, −20° C. or greater, −10° C. or greater, 0° C. or greater, 10° C. or greater, 20° C. or greater, 30° C. or greater, 40° C. or greater, 50° C. or greater, 60° C. or greater, 70° C. or greater, or 80° C. or greater). In some cases, the polymer has a measured $T_g$ of 100° C. or less (e.g., less than 100° C., 90° C. or less, 80° C. or less, 70° C. or less, 60° C. or less, 50° C. or less, 40° C. or less, 30° C. or less, 25° C. or less, 20° C. or less, 10° C. or less, 0° C. or less, −10° C. or less, −20° C. or less, −25° C. or less, −30° C. or less, −35° C. or less, −40° C. or less, −45° C. or less, or −50° C. or less). In certain embodiments, the polymer has a measured $T_g$ of from −90° C. to 90° C., from −90° C. to 50° C., from −90° C. to 40° C., from −90° C. to 30° C., from −90° C. to 25° C., −90° C. to 0° C., −90° C. to −10° C., from −80° C. to 25° C., from −80° C. to 10° C., from −80° C. to 0° C., from −80° C. to −10° C., from −60° C. to 30° C., from −60° C. to 25° C., from −60° C. to 0° C., from −60° C. to less than 0° C. or from −40° C. to less than 0° C.

The polymer binder can be formed from an aqueous dispersion, for example, an aqueous latex dispersion. In some embodiments, the polymer binder can include an aqueous latex dispersion of an acrylic homopolymer, a vinyl-aromatic-acrylic polymer, a vinyl-acrylic polymer, a vinyl chloride polymer, an acrylic-polyurethane hybrid polymer, a vinyl alkanoate polymer, or a combination thereof.

Typical polymer binders used in coating compositions for applications such as paints and inks are known in the art. For example, paint and ink formulations can include polymer binders commercially available under the trade name ACRONAL® (available from BASF), JONCRYL® (available from BASF), RHOPLEX® (available from The Dow Chemical Company), ROVACE® (available from The Dow Chemical Company), and EVOQUE® (available from The Dow Chemical Company).

Spheres

Porous Metal Oxide Spheres

As described herein, the coating compositions include a sphere such as a microsphere. The term "sphere" as used herein refers to a particle, particularly, although not essentially, to a particle of circular cross-section, which has a largest dimension or mean diameter of at least 1 μm, or from 1 μm to 100 μm. The sphere or microsphere can have reflective properties. The term "reflective" refers to an ability to scatter or reflect light of a particular wavelength from a surface. The spheres described herein are capable of reflecting light of ultraviolet (UV), visible, or infrared (IR) wavelengths, or a combination thereof. Wavelengths in the UV region range from 10 nm to 400 nm, such as from 100 nm to 400 nm or from 200 to 400 nm. Wavelengths in the visible region range from 400 nm to 800 nm, such as from 400 nm to 650 nm, or from 450 nm to 650 nm. Wavelengths in the infrared region range from 800 nm to 10000 nm, such as from 800 nm to 5000 nm, from 800 nm to 2500 nm, or from 800 nm to 1000 nm. The spheres described herein are also capable of reflecting light having a wavelength of from 100 nm to 800 nm, such as from 100 nm to 600 nm, from 200 nm to 800 nm, or from 200 to 400 nm, thus providing improved opacity. Spectroscopic methods for determining reflectance values of a solid substance, including the spheres, are well known in the art and include, for example, pressing a neat powder of the solid substance and placing the powder sample into a chamber of a spectrophotometer equipped with a reflectance spectroscopy accessory.

When an incident electromagnetic beam falls on a solid sample, reflection, transmission, and/or absorption can occur. The specific optical effect that occurs is dependent on the sample's physical characteristics and chemical composition. As such, the reflective and absorptive properties of the spheres described herein can be independently tuned across several different wavelength-scales by modifying for example, the geometric properties and surface chemistry of the spheres. Specifically, the spheres described herein has a reflectance tuning ability in the whole range of the UV, visible, and IR regions as further discussed herein.

In some examples, the spheres are derived from porous metal oxide spheres formed from metal oxide particles (e.g., nanoparticles). The term "metal oxide" refers to oxygen containing species of various metals, such as silicon, titanium, aluminum, zirconium, cerium, iron, zinc, indium, tin, chromium, antimony, bismuth, cobalt, gallium, lanthanum, molybdenum, neodymium, nickel, niobium, vanadium, or combinations thereof. In specific examples, the metal oxide particles can include a metal oxide selected from silica, titania, alumina, zirconia, ceria, iron oxides, zinc oxide, or combinations thereof. More specifically, the metal oxide particles can include $SiO_2$, $TiO_2$, $Ti_2O_3$, $Al_2O_3$, or $Fe_2O_3$.

To obtain reflectance over a wide spectral range, more than one type (a blend) of porous metal oxide sphere can be incorporated in the coating compositions. A combination of two porous metal oxide spheres can increase the spectral range over which reflectance is observed.

Preferably, the porous metal oxide spheres exhibit an ability to disperse well into the coating compositions and thus uniformly coat a surface. In particular, the porous metal oxide spheres are preferably compatible with all types of solvent and coating systems such as acrylics and styrene-acrylic systems.

The porous metal oxide spheres can include one or more metal oxides in an amount of 60% by weight or greater. For example, the porous metal oxide spheres can include one or more metal oxides in an amount of 65% or greater, 70% or greater, 75% or greater, 80% or greater, 85% or greater, 90% or greater, 95% or greater, 97% or greater, 98% or greater, 99% or greater, or up to 100% by weight of the porous metal oxide sphere. In some embodiments, the porous metal oxide spheres can include one or more metal oxides in an amount of 65% up to 100% by weight (e.g., from 65% to 99%, from 70% to 99%, from 80% to 99%, from 90% to 99%, from 70% to 90%, or from 75% to 95% by weight), based on the weight of the porous metal oxide sphere.

As the porous metal oxide spheres are prepared with the use of a polymeric sacrificial particles which is removed for instance via calcination, the porous metal oxide spheres can include a minor amount of carbon containing material produced in situ from polymer decomposition. In some embodiments, the porous metal oxide spheres can include carbon black or a hydrocarbon material. Carbon black pigments has a high IR absorption and are conventionally used in coatings such as paints and stains. In some embodiments of the coating compositions disclosed herein, controlled calcination can be employed to produce carbon black in situ in the porous metal oxide spheres. The porous metal oxide spheres can include materials other than the metal oxides (such as carbon black) in an amount of less than 35% by weight, (e.g., less than 20%, less than 15%, less than 10%, less than 5%, less than 2%, less than 1%, from 0% to 35%, from 0.1% to 20%, from 0.1% to 10%, from 0.1% to 5%, or from 0.1% to 2% by weight), based on the weight of the porous metal oxide sphere.

The porous metal oxide spheres are porous. The term "porous" as used herein refers to one or more interconnected or non-interconnected pores, voids, spaces, or interstices that allow air or liquid to pass through. In general, porosity, void diameter, and particle size diameter of spherical spheres can be tuned to enable the coating composition to scatter incident light over the whole range of the UV, visible, and IR regions.

The term "porosity" as used herein refers to a measure of the empty spaces (or voids or pores) in the spheres and is a ratio of the volume of voids to total volume of the mass of the spheres between 0 and 1, or as a percentage between 0 and 100%. Average porosity of a sphere means the total pore volume, as a fraction of the volume of the entire sphere. Porosity can be measured by means known in the art such as by mercury porosimetry analysis. The porous metal oxide spheres can contain uniform or non-uniform pore diameters, a result of the polymer particles being spherical and monodisperse or polydisperse.

The porous metal oxide spheres may contain a high degree of porosity due to removal of the sacrificial polymer particles described herein. In some embodiments, the porous metal oxide spheres can have an average porosity of 0.10 or greater. For example, the porous metal oxide spheres can have an average porosity of 0.15 or greater, 0.18 or greater, 0.20 or greater, 0.25 or greater, 0.28 or greater, 0.30 or greater, 0.35 or greater, 0.40 or greater, 0.45 or greater, 0.50 or greater, 0.55 or greater, 0.60 or greater, 0.65 or greater, 0.70 or greater, 0.75 or greater, 0.80 or greater, 0.85 or greater, or up to 0.90. In certain embodiments, the porous metal oxide spheres can have an average porosity of 0.90 or less, 0.85 or less, 0.80 or less, 0.75 or less, 0.70 or less, 0.65 or less, 0.60 or less, 0.55 or less, 0.50 or less, 0.45 or less, 0.40 or less, 0.35 or less, 0.30 or less, 0.25 or less, 0.20 or less, or 0.15 or less. The porous metal oxide spheres can have a porosity from any of the minimum values to any of the maximum values described above of the porous metal oxide spheres. For example, the porous metal oxide spheres can have an average porosity of from 0.10 to 0.90, from 0.10 to 0.80, from 0.15 to 0.80, from 0.20 to 0.70, from 0.20 to 0.60, from 0.45 to 0.70, from 0.40 to 0.65, from 0.45 to 0.65, or from 0.45 to 0.55.

The porosity of the porous metal oxide spheres can be such that the spheres have a solid core (center) where the porosity is in general towards the exterior surface of the sphere. In other embodiments, the porous metal oxide spheres can have a hollow core where a major portion of the porosity is towards the interior of the spheres. In other embodiments, the porosity can be distributed throughout the volume of the spheres. In further embodiments, the porosity can exist as a gradient, with higher porosity towards the exterior surface of the spheres and lower or no porosity (solid) towards the center; or with lower porosity towards the exterior surface and with higher or complete porosity (hollow) towards the center.

As discussed herein, there also exists a relationship between the pore size/pore diameter and the reflectance properties of the spheres with respect to the wavelength. The average pore size (or pore diameter) of the spheres derived from the porous metal oxide spheres can vary, depending on the size of the sacrificial polymer particles used to create the pore size (although some "shrinkage" or compaction may occur upon polymer removal, providing pore sizes somewhat smaller than the original polymer particle size). As described herein, spherical monodispersed sacrificial polymer particles (e.g., nanoparticles) can be employed to create a substantially uniform and unimodal distribution of pore sizes. In other cases, a multimodal distribution of sacrificial polymer particles (e.g., nanoparticles) can be employed to create a multimodal distribution, such as a bimodal distribution, of pore sizes. In general, however, the pore size of the spheres derived from the porous spheres is nano- or micro-scaled, preferably from about 50 nm to about 10000 nm.

In some embodiments, the porous metal oxide sphere can have an average pore diameter of 50 nm or greater, 75 nm or greater, 100 nm or greater, 150 nm or greater, 200 nm or greater, 250 nm or greater, 300 nm or greater, 350 nm or greater, 400 nm or greater, 450 nm or greater, 500 nm or greater, 550 nm or greater, 600 nm or greater, 650 nm or greater, 700 nm or greater, 750 nm or greater, 800 nm or greater, 850 nm or greater, 1 μm or greater, 1.5 μm or greater, 2 μm or greater, 2.5 μm or greater, 3 μm or greater, 3.5 μm or greater, 4 μm or greater, 4.5 μm or greater, 5 μm or greater, 5.5 μm or greater, 6 μm or greater, 7 μm or greater, 7.5 μm or greater, 8 μm or greater, 8.5 μm or greater, 9 μm or greater, 9.5 μm or greater, or up to 10 μm. In some embodiments, the porous metal oxide spheres can have an average pore diameter of 10 μm or less, 9.5 μm or less, 9 μm or less, 8.5 μm or less, 8 μm or less, 7.5 μm or less, 7 μm or less, 6.5 μm or less, 6 μm or less, 5.5 μm or less, 5 μm or less, 4.5 μm or less, 4 μm or less, 3.5 μm or less, 3 μm or less, 2.5 μm or less, 2 μm or less, 1.5 μm or less, 1 μm or less, 950 nm or less, 800 nm or less, 750 nm or less, 700 nm or less, 650 nm or less, 600 nm or less, 550 nm or less, 500 nm or less, 450 nm or less, 400 nm or less, 350 nm or less, 300 nm or less, 250 nm or less, 200 nm or less, 150 nm or less, or 100 nm or less. The porous metal oxide spheres can have an average pore diameter from any of the minimum values to any of the maximum values described above of the porous metal oxide spheres. For example, the porous metal oxide spheres can have an average pore diameter of from 50 nm to 10 μm, from 50 nm to 5 μm, from 100 nm to 10 μm, from 100 nm to 5 μm, from 100 nm to 2.5 μm, from 100 nm to 1 μm, from 800 nm to 10 μm, from 800 nm to 5 μm, from 800 nm to 2.5 μm, from 800 nm to 1 μm, from 400 nm to 800 nm, from 400 nm to 700 nm, from 200 nm to 400 nm, or from 100 nm to 400 nm. The average pore diameter of the porous metal oxide spheres can be determined by electron microscopy.

The pore size and pore distribution of the porous metal oxide spheres can be ordered (periodic structures) or disordered (random structures). Angle-dependent reflectance may be achieved in the coatings using the porous metal oxide spheres having an ordered pore size distribution. An ordered pore size and pore distribution may be achieved for example with the use of monodisperse sacrificial polymer particles during preparation of the porous metal oxide spheres or when a step of drying the liquid droplets to provide the porous metal oxide spheres is performed slowly, allowing the metal oxide and sacrificial polymer particles to become ordered. Angle-independent reflectance may be achieved in the coatings using porous metal oxide spheres having a disordered pore size and pore distribution. A disordered pore size and pore distribution may be achieved for example when a step of drying the liquid droplets is performed quickly, not allowing the metal oxide and sacrificial polymer particles to become ordered.

Polymer Spheres

In alternate embodiments, the spheres (e.g., microspheres) can be organic and include polymer spheres formed from a multimodal distribution of polymer particles (e.g., nanoparticles). Like the porous metal oxide spheres, the reflective and absorptive properties of the polymer spheres can be independently tuned across the whole range of the UV, visible, and IR regions by modifying for example, their geometric properties and surface chemistry as discussed herein. The polymer spheres can include a polymer selected from poly(meth)acrylic acid, poly(meth)acrylates, polystyrenes, polyacrylamides, polyethylene, polypropylene, polylactic acid, polyacrylonitrile, derivatives thereof, salts thereof, blends thereof, or copolymers thereof. In some cases, the polymer spheres can include copolymers such as polystyrene/acrylic acid, polystyrene/poly(ethylene glycol) methacrylate or polystyrene/styrene sulfonate.

As described herein the polymer spheres can be formed from polymer particles (e.g., nanoparticles). The packing of the polymer particles in the polymer spheres can be ordered (periodic structures) or disordered (random structures). The polymer particles can have an average diameter of 50 nm or greater, 75 nm or greater, 100 nm or greater, 120 nm or greater, 150 nm or greater, 170 nm or greater, 200 nm or greater, 250 nm or greater, 300 nm or greater, 350 nm or greater, 400 nm or greater, 450 nm or greater, 500 nm or greater, 550 nm or greater, 600 nm or greater, 650 nm or greater, 700 nm or greater, 750 nm or greater, 800 nm or greater, 850 nm or greater, 900 nm or greater, 950 nm or greater, or 1000 nm or greater. For example, the polymer particles can have an average diameter of from 50 nm to 1 μm, from 50 nm to 750 nm, from 100 nm to 1 μm, from 100 nm to 750 nm, from 100 nm to 500 nm, from 100 nm to 400 nm, or from 200 nm to 400 nm.

As described herein, the polymer spheres can be formed from a multimodal distribution of polymer particles with respect to size, for example, bimodal, trimodal, quadrimodal, and such the like. In some embodiment, a first population of polymer particles in the polymer spheres can have an average diameter of from 50 nm to 750 nm, from 100 nm to 750 nm, from 100 nm to 500 nm, from 100 nm to 400 nm, or from 200 nm to 400 nm. In some embodiment, a second population of polymer particles in the polymer spheres can have an average diameter of from 500 nm to 1 μm, from 500 nm to 750 nm, from 600 nm to 900 nm, or from 750 nm to 1 μm.

The polymer spheres can be formed from a multimodal distribution of polymer particles, for example, bimodal, trimodal, quadrimodal, and such the like, with respect to the composition of the polymer particles. For example, the polymers of each population of polymer particles can be different. In alternate embodiments, the polymers of each population of polymer particles can be the same.

The spheres derived from the porous metal oxide spheres or the polymer spheres can have an average diameter of 1 μm or greater, 1.5 μm or greater, 2 μm or greater, 2.5 μm or greater, 3 μm or greater, 3.5 μm or greater, 4 μm or greater, 4.5 μm or greater, 5 μm or greater, 5.5 μm or greater, 6 μm or greater, 7 μm or greater, 7.5 μm or greater, 8 μm or greater, 8.5 μm or greater, 9 μm or greater, 9.5 μm or greater, 10 μm or greater, 15 μm or greater, 20 μm or greater, 30 μm or greater, 40 μm or greater, 50 μm or greater, 60 μm or greater, 70 μm or greater, 80 μm or greater, 90 μm or greater, or 100 μm or greater. In some embodiments, the spheres derived from the porous metal oxide spheres or the polymer spheres can have an average diameter of 100 μm or less, 90 μm or less, 80 μm or less, 70 μm or less, 60 μm or less, 50 μm or less, 40 μm or less, 30 μm or less, 20 μm or less, 15 μm or less, 10 μm or less, 9.5 μm or less, 9 μm or less, 8.5 μm or less, 8 μm or less, 7.5 μm or less, 7 μm or less, 6.5 μm or less, 6 μm or less, 5.5 μm or less, 5 μm or less, 4.5 μm or less, 4 μm or less, 3.5 μm or less, 3 μm or less, 2.5 μm or less, 2 μm or less, 1.5 μm or less, or 1 μm or less. The spheres derived from the porous metal oxide spheres or the polymer spheres can have an average diameter from any of the minimum values to any of the maximum values described above of the spheres. For example, the spheres derived from the porous metal oxide spheres or the polymer spheres can have an average diameter of from 1 μm to 100 μm, from 5 μm to 100 μm, from 10 μm to 50 μm, from 1 μm to 10 μm, from 1 μm to 5 μm, or from 1 μm to 3 μm. The average particle diameter (also referred to herein as average particle size) of the spheres derived from the porous metal oxide spheres or the polymer spheres can be determined by scanning electron microscopy (SEM) or transmission electron microscopy (TEM). Average particle size is synonymous with D50, meaning half of the population resides above this point, and half below.

As discussed herein, the UV, visible, or IR reflective properties and efficiencies of the coating compositions can be controlled by the physical and chemical properties of the spheres. To find the optimum reflectance characteristics of the coating compositions, the sphere properties can be tuned. In particular, the spheres can be made highly reflective because their geometry, the number of pores within a given pigment that are active, and degree of order can be precisely controlled. In addition to their reflective properties, the spheres can exhibit improved hiding capabilities. These features of the spheres provide the capability of producing improved reflectance in coating compositions not previously attainable with conventional pigments, which lacked the tuning capabilities of the spheres. When the optimization parameters are maximized, the resultant coatings can have high reflectance in the UV, visible, or IR region, or a combination thereof.

Coating Compositions

Provided herein are coating compositions comprising a polymer binder and a sphere (e.g., a microsphere) as described herein. The coating compositions when dried, can exhibit UV reflectance, such as within a wavelength from 100 nm to 400 nm; visible light reflectance such as within a wavelength of from 400 to 800 nm; IR reflectance such as within a wavelength from 800 nm to 10 μm; reflectance within a wavelength of from 100 to 800 nm for providing improved opacity; or a combination thereof. The reflectance of the coatings with respect to the wavelength and intensity can be dependent on the physical characteristics (such as particle size, porosity, and pore size) as well as the chemical characteristics of the spheres, as discussed herein.

In some embodiments, the coating composition is a UV reflective composition. In some examples, the UV reflective composition can include porous metal oxide spheres having an average diameter of from 1 μm to 10 μm (e.g., from 1 μm to 10 μm, from 2 μm to 10 μm, from 1 μm to 5 μm, from 0.5 μm to 3 μm, from 1 μm to 3 μm, from 1 μm to 2.5 μm, or from 1.5 μm to 3 μm); an average porosity of 0.20 or greater (e.g., from 0.20 to 0.90, from 0.20 to 0.80, from 0.20 to 0.70, from 0.30 to 0.65, from 0.40 to 0.65, from 0.45 to 0.65, or from 0.45 to 0.55); and an average pore diameter of from 50 nm to 400 nm (e.g., from 100 nm to 400 nm, from 50 nm to 350 nm, from 50 nm to 300 nm, from 50 nm to 250 nm, from 50 nm to 200 nm, from 150 nm to 400 nm, from 200 nm to 400 nm, or from 100 nm to 350 nm). In other examples, the UV reflective composition can be a clear coating compositions comprising a polymer selected from acrylic homopolymers, styrene-acrylic-based copolymers, styrene-butadiene-based copolymers, styrene-butadiene-styrene copolymers, vinyl acrylic copolymers, ethylene vinyl acetate copolymers, polychloroprene, blends thereof, or copolymers thereof; and a sphere comprising porous metal oxide spheres formed from metal oxide particles, wherein the sphere has an average particle size diameter of from 1 micron to 10 microns, from 1 micron to 5 microns, or from 1 micron to 3 microns, and wherein the clear coating composition when dried exhibits a UV reflectance at a wavelength range from 100 nm to 400 nm. The UV reflective compositions can further comprise one or more UV absorbers, such as selected from a hydroxy-phenyl-benzotriaziole, a hydroxy-phenyl-triazine, a hydroxyl-benzophenone, an oxanilide, a cyanoacrylate, a malonate and a mixture thereof.

In some embodiments, the coating composition is a composition having improved opacity. In some examples, the composition having improved opacity can include porous metal oxide spheres having an average diameter of from 0.5 μm to 100 μm (e.g., from 1 μm to 100 μm, from 1 μm to 50 μm, from 1 μm to 30 μm, from 1 μm to 20 μm, from 1 μm to 10 μm, from 1 μm to 8 μm, or from 2 μm to 7 μm); an average porosity of 0.20 or greater (e.g., from 0.20 to 0.90, from 0.20 to 0.80, from 0.20 to 0.70, from 0.30 to 0.65, from 0.40 to 0.65, from 0.45 to 0.65, or from 0.45 to 0.55); and an average pore diameter of from 50 nm to 800 nm (e.g., from 50 nm to 600 nm, from 50 nm to 400 nm, from 50 nm to 200 nm, from 100 nm to 800 nm, from 100 nm to 600 nm, from 100 nm to 400 nm, from 200 nm to 800 nm, from 200 nm to 400 nm, from 250 nm to 400 nm, or from 200 nm to 350 nm). In other examples, the coating compositions exhibiting improved opacity are paint compositions comprising a polymer selected from acrylic homopolymers, styrene-acrylic-based copolymers, styrene-butadiene-based copolymers, styrene-butadiene-styrene copolymers, vinyl acrylic copolymers, ethylene vinyl acetate copolymers, polychloroprene, blends thereof, or copolymers thereof; and a sphere selected from porous metal oxide spheres formed from metal oxide particles, polymer spheres formed from a multimodal distribution of polymer particles, or a mixture thereof, wherein the sphere has an average particle size diameter of 100 microns or less, 50 microns or less, more 10 microns or less, or from 1 micron to 10 microns, and an average porosity of from or from 0.40 to 0.65, or from 0.45 to 0.55.

In some embodiments, the coating composition is an IR reflective composition. In some examples, the IR reflective composition can include porous metal oxide spheres having an average diameter of from 5 μm to 100 μm (e.g., from 5 μm to 75 μm, from 5 μm to 50 μm, or from 10 μm to 30 μm); an average porosity of 0.20 or greater (e.g., from 0.20 to 0.90, from 0.20 to 0.80, from 0.20 to 0.70, from 0.30 to 0.65, from 0.40 to 0.65, from 0.45 to 0.65, or from 0.45 to 0.55); and an average pore diameter of from 400 nm to 10 μm (e.g., from 400 nm to 5 μm, from 400 nm to 2.5 μm, from 400 nm to 1 μm, from 800 nm to 10 μm, from 800 nm to 5 μm, from 800 nm to 2.5 μm, from 800 nm to 1.5 μm, or from 800 nm to 1 μm). In some examples, the IR reflective composition can include porous metal oxide spheres having an average diameter of greater than about 50 μm (e.g., from 80 μm to 100 μm or about 100 μm); an average porosity of 0.20 or greater (e.g., from 0.20 to 0.90, from 0.20 to 0.80, from 0.20 to 0.70, from 0.30 to 0.65, from 0.40 to 0.65, from 0.45 to 0.65, or from 0.45 to 0.55); and an average pore diameter of from 400 nm to 10 μm (e.g., from 400 nm to 5 μm, from 400 nm to 2.5 μm, from 400 nm to 1 μm, from 800 nm to 10 μm, from 800 nm to 5 μm, from 800 nm to 2.5 μm, from 800 nm to 1.5 μm, or from 800 nm to 1 μm). In some examples, the IR reflective composition can include porous metal oxide spheres having an average diameter of less than about 5 μm (e.g., about 5 μm); an average porosity of 0.20 or greater (e.g., from 0.20 to 0.90, from 0.20 to 0.80, from 0.20 to 0.70, from 0.30 to 0.65, from 0.40 to 0.65, from 0.45 to 0.65, or from 0.45 to 0.55); and an average pore diameter of from 400 nm to 1 μm (e.g., from 400 nm to 900 nm, from 400 to 800 nm, from 400 to 750 nm, or from 400 to 700 nm).

In other examples, the IR reflective coating composition comprises a polymer selected from acrylic homopolymers, styrene-acrylic-based copolymers, styrene-butadiene-based copolymers, styrene-butadiene-styrene copolymers, vinyl acrylic copolymers, ethylene vinyl acetate copolymers, polychloroprene, alkyd resin, polyester resins, polyurethane resins, silicone resins, petroleum resins, epoxy resins, blends thereof, or copolymers thereof; and a sphere selected from porous metal oxide spheres formed from metal oxide particles (e.g., nanoparticles), polymer spheres formed from a multimodal distribution of polymer particles (e.g., nanoparticles), or a mixture thereof, wherein the sphere has an average particle size diameter of 5 microns or greater or from 5 microns to 100 microns and an average porosity of from or from 0.40 to 0.65 or from 0.45 to 0.55, and wherein the coating composition when dried exhibits an IR reflectance at a wavelength range from 800 nm to 10 microns, from 800 nm to 2.5 microns, or from 800 nm to 1 micron.

The coating compositions can include the sphere in an amount from greater than 0% by weight to 99.9% by weight (e.g., 0.1% or greater, 0.5% or greater, 1% or greater, 2.5% or greater, 5% or greater, 7% or greater, 10% or greater, 12.5% or greater, 15% or greater, 20% or greater, 22% or greater, 25% or greater, 30% or greater, 35% or greater, 40% or greater, 45% or greater, 50% or greater, 55% or greater, 60% or greater, 65% or greater, 70% or greater, 75% or greater, 80% or greater, 85% or greater, 90% or greater, 95% or greater, or up to 99.9% by weight), based on the total dry weight of the coating composition. The coating composition can include the sphere in an amount of 99.9% by weight or less, 99% by weight or less, 98% by weight or less, 95% by weight or less, 90% by weight or less, 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, 15% by weight or less, 10% by weight or less, 8% by weight or less, 7% by weight or less, 6% by weight or 5% by weight or less, 4% by weight or less, 3% by weight or less, 2% by weight or less, or 1% by weight or less), based on the total dry weight of the coating composition. The coating composition can include the sphere in an amount from 0.1% by weight to 99.9% by weight, from 0.5% by weight to 99% by weight, from 0.5% by weight to 95% by weight, from 1% by weight to 90% by weight, from 5% by weight to 99.9% by weight, from 10% by weight to 90% by weight, from 15% by weight to 85% by weight, based on the total dry weight of the coating composition.

The coating composition can include the polymer binder in an amount from greater than 0% by weight to 99.9% by weight (e.g., 0.1% or greater, 0.5% or greater, 1% or greater, 2.5% or greater, 5% or greater, 7% or greater, 10% or greater, 12.5% or greater, 15% or greater, 20% or greater, 22% or greater, 25% or greater, 30% or greater, 35% or greater, 40% or greater, 45% or greater, 50% or greater, 55% or greater, 60% or greater, 65% or greater, 70% or greater, 75% or greater, 80% or greater, 85% or greater, 90% or greater, 95% or greater, or up to 99.9% by weight), based on the total dry weight of the coating composition. The coating composition can include the polymer binder in an amount of 99.9% by weight or less, 99% by weight or less, 98% by weight or less, 95% by weight or less, 90% by weight or less, 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, 15% by weight or less, 10% by weight or less, 8% by weight or less, 7% by weight or less, 6% by weight or 5% by weight or less, 4% by weight or less, 3% by weight or less, 2% by weight or less, or 1% by weight or less), based on the total dry weight of the coating composition. The coating composition can include the polymer binder in an amount from 0.1% by weight to 99.9% by weight, from 0.5% by weight to 99% by weight, from 0.5% by weight to 95% by weight, from 1% by weight to 90% by weight, from 5% by weight to 99.9% by weight, from 10% by weight to 90% by weight, from 15% by weight to 85% by weight, based on the total dry weight of the coating composition.

The coating compositions can include additional components. For example, the coating compositions can include an additive such as a pigment dispersant, an inorganic or organic filler, an additional pigment, a pigment extender, a thickener, a defoamer, a surfactant, a biocide, an adhesion enhancer, a coalescing agent, a film forming aid, a flame retardant, a stabilizer, a curing agent, a flow agent, a leveling agent, a light stabilizer, a wetting agent, a hardener, a tackifier, an anti-settling aid, a texture-improving agent, an antiflocculating agent, or a combination thereof. The additive can be added to impart certain properties to the coating compositions such as thickness, texture, handling, fluidity, smoothness, whiteness, increased density or weight, decreased porosity, increased opacity, flatness, glossiness, decreased blocking resistance, barrier properties, and the like.

In some embodiments, the coating compositions include a mineral filler and/or a pigment. When present, the mineral filler and/or pigment can be selected from $TiO_2$ (in both anatase and rutile forms), clay (aluminum silicate), $CaCO_3$ (in both ground and precipitated forms), aluminum trihydrate, fly ash, or aluminum oxide, silicon dioxide, magnesium oxide, talc (magnesium silicate), barytes (barium sulfate), zinc oxide, zinc sulfite, sodium oxide, potassium oxide, and mixtures thereof. Examples of commercially available titanium dioxide pigments are KRONOS® 2101, KRONOS® 2310, available from Kronos WorldWide, Inc., TI-PURE® R-900, available from DuPont, or TIONA® AT1 commercially available from Millennium Inorganic Chemicals. Titanium dioxide is also available in concentrated dispersion form. An example of a titanium dioxide dispersion is KRONOS® 4311, also available from Kronos Worldwide, Inc. Suitable pigment blends of mineral fillers are sold under the marks MINEX® (oxides of silicon, aluminum, sodium and potassium commercially available from Unimin Specialty Minerals), CELITE® (aluminum oxide and silicon dioxide commercially available from Celite Company), and ATOMITE® (commercially available from Imerys Performance Minerals). Exemplary fillers also include clays such as attapulgite clays and kaolin clays including those sold under the ATTAGEL® and ANSILEX® marks (commercially available from BASF Corporation). Additional fillers include nepheline syenite, (25% nepheline, 55% sodium feldspar, and 20% potassium feldspar), feldspar (an aluminosilicate), diatomaceous earth, calcined diatomaceous earth, talc (hydrated magnesium silicate), aluminosilicates, silica (silicon dioxide), alumina (aluminum oxide), mica (hydrous aluminum potassium silicate), pyrophyllite (aluminum silicate hydroxide), perlite, baryte (barium sulfate), wollastonite (calcium metasilicate), and combinations thereof. More preferably, the coating compositions can include $TiO_2$, $CaCO_3$, and/or a clay. In some embodiments, the coating composition does not include a pigment and/or a mineral filler other than the sphere.

When present, the mineral filler and/or pigment can comprise particles having a number average particle size of 50 microns or less (e.g., 45 microns or less, 40 microns or less, 35 microns or less, 30 microns or less, 25 microns or less, 20 microns or less, 18 microns or less, 15 microns or less, 10 microns or less, 8 microns or less, or 5 microns or less). In some embodiments, the mineral filler and/or pigment can have a number average particle size of 10 microns or greater, 12 microns or greater, 15 microns or greater, 20 microns or greater, 25 microns or greater, 30 microns or greater, 35 microns or greater, 40 microns or greater, or 45 microns or greater. In some embodiments, the mineral filler and/or pigment can have a number average particle size of from 10 microns to 50 microns, from 10 microns to 35 microns, or from 10 microns to 25 microns.

The mineral filler and/or pigment, if present, can be present in an amount of 1% by weight or greater, based on the total weight of the coating composition. For example, the mineral filler and/or pigment can be present in an amount of from 1% by weight to 85% by weight, from 10% by weight to 85% by weight, from 15% by weight to 75% by weight or from 15% by weight to 65% by weight, based on the total weight of the coating composition. The coating compositions can include spheres and a combination of mineral fillers and pigments in weight ratios of 90:10, 80:20, 70:30, 60:40, 50:50, 40:60, 30:70, 20:80 or 10:90. In some cases, the coating composition can include from 0.1% by weight to 90% by weight (e.g., from 1% by weight to 60% by weight, from 1% by weight to 55% by weight, from 1% by weight to 50% by weight, or from 5% by weight to 50% by weight) of spheres and/or mineral fillers and/or pigments.

Examples of suitable pigment dispersing agents for use in the coating compositions are polyacid dispersants and hydrophobic copolymer dispersants. Polyacid dispersants are typically polycarboxylic acids, such as polyacrylic acid or polymethacrylic acid, which are partially or completely in the form of their ammonium, alkali metal, alkaline earth metal, ammonium, or lower alkyl quaternary ammonium salts. Hydrophobic copolymer dispersants include copolymers of acrylic acid, methacrylic acid, or maleic acid with hydrophobic monomers. In certain embodiments, the composition includes a polyacrylic acid-type dispersing agent, such as Pigment Disperser N, commercially available from BASF SE.

Examples of suitable thickeners include hydrophobically modified ethylene oxide urethane (HEUR) polymers, hydrophobically modified alkali soluble emulsion (HASE) polymers, hydrophobically modified hydroxyethyl celluloses (HMHECs), hydrophobically modified polyacrylamide, and combinations thereof. HEUR polymers are linear reaction products of diisocyanates with polyethylene oxide end-capped with hydrophobic hydrocarbon groups. HASE polymers are homopolymers of (meth)acrylic acid, or copolymers of (meth)acrylic acid, (meth)acrylate esters, or maleic acid modified with hydrophobic vinyl monomers. HMHECs include hydroxyethyl cellulose modified with hydrophobic alkyl chains. Hydrophobically modified polyacrylamides include copolymers of acrylamide with acrylamide modified with hydrophobic alkyl chains (N-alkyl acrylamide). In certain embodiments, the coating composition includes a hydrophobically modified hydroxyethyl cellulose thickener. Other suitable thickeners that can be used in the coating compositions can include acrylic copolymer dispersions sold under the STEROCOLL™ and LATEKOLL™ trademarks from BASF Corporation, Florham Park, N.J.; urethanes thickeners sold under the RHEOVIS™ trademark (e.g., Rheovis PU 1214); hydroxyethyl cellulose; guar gum; carrageenan; xanthan; acetan; konjac; mannan; xyloglucan; and mixtures thereof. The thickeners can be added to the composition compositions as an aqueous dispersion or emulsion, or as a solid powder.

Suitable coalescing aids, which aid in film formation during drying, include ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, propylene glycol n-butyl ether, dipropylene glycol n-butyl ether, 2,2,4-trimethyl-1,3-pentanediol monoisobutyrate, or combinations thereof. In some embodiments, the coating compositions can include one or more coalescing aids such as propylene glycol n-butyl ether and/or dipropylene glycol n-butyl ether. The coalescing aids, if present, can be present in an amount of from greater than 0% to 30%, based on the dry weight of the polymer binder. For example, the coalescing aid can be present in an amount of from 10% to 30%, from 15% to 30% or from 15% to 25%, based on the dry weight of the polymer binder. In some embodiments, the coalescing aid can be included in coating compositions comprising a high Tg polymer binder (that is a polymer having a Tg greater than ambient temperature (e.g., 20° C.)). In these embodiments, the coalescing aid can be present in an effective amount to provide coating compositions having a Tg less than ambient temperature (e.g., 20° C.). In some embodiments, the compositions do not include a coalescing aid.

Defoamers serve to minimize frothing during mixing and/or application of the coating compositions. Suitable defoamers include organic defoamers such as mineral oils, silicone oils, and silica-based defoamers. Exemplary silicone oils include polysiloxanes, polydimethylsiloxanes, polyether modified polysiloxanes, or combinations thereof. Exemplary defoamers include BYK®-035, available from BYK USA Inc., the TEGO® series of defoamers, available from Evonik Industries, the DREWPLUS® series of defoamers, available from Ashland Inc., and FOAMASTER® NXZ, available from BASF Corporation.

Plasticizers can be added to the coating compositions to reduce the glass transition temperature ($T_g$) of the compositions below that of the drying temperature to allow for good film formation. Suitable plasticizers include diethylene glycol dibenzoate, dipropylene glycol dibenzoate, tripropylene glycol dibenzoate, butyl benzyl phthalate, or a combination thereof. Exemplary plasticizers include phthalate-based plasticizers. The plasticizer can be present in an amount of from 1% to 15%, based on the dry weight of the polymer binder. For example, the plasticizer can be present in an amount of from 5% to 15% or from 7% to 15%, based on the dry weight of the polymer binder. In some embodiments, the plasticizer can be present in an effective amount to provide coating compositions having a Tg less than ambient temperature (e.g., 20° C.). In some embodiments, the compositions do not include a plasticizer.

Suitable surfactants include nonionic surfactants and anionic surfactants. Examples of nonionic surfactants are alkylphenoxy polyethoxyethanols having alkyl groups of about 7 to about 18 carbon atoms and having from about 6 to about 60 oxyethylene units; ethylene oxide derivatives of long chain carboxylic acids; analogous ethylene oxide condensates of long chain alcohols, and combinations thereof. Exemplary anionic surfactants include ammonium, alkali metal, alkaline earth metal, and lower alkyl quaternary ammonium salts of sulfosuccinates, higher fatty alcohol sulfates, aryl sulfonates, alkyl sulfonates, alkylaryl sulfonates, and combinations thereof. In certain embodiments, the composition comprises a nonionic alkylpolyethylene glycol surfactant, such as LUTENSOL® TDA 8 or LUTENSOL® AT-18, commercially available from BASF SE. In certain embodiments, the composition comprises an anionic alkyl ether sulfate surfactant, such as DISPONIL® FES 77, commercially available from BASF SE. In certain embodiments, the composition comprises an anionic diphenyl oxide disulfonate surfactant, such as CALFAX® DB-45, commercially available from Pilot Chemical.

Examples of suitable pH modifying agents include bases such as sodium hydroxide, potassium hydroxide, amino alcohols, monoethanolamine (MEA), diethanolamine (DEA), 2-(2-aminoethoxy)ethanol, diisopropanolamine (DIPA), 1-amino-2-propanol (AMP), ammonia, and combinations thereof. In some embodiments, the compositions do not include an ammonia-based pH modifier. The pH of the dispersion can be greater than 7. For example, the pH can be 7.5 or greater, 8.0 or greater, 8.5 of greater, or 9.0 or greater.

Suitable biocides can be incorporated to inhibit the growth of bacteria and other microbes in the coating composition during storage. Exemplary biocides include 2-[(hydroxymethyl)amino]ethanol, 2-[(hydroxymethyl) amino]2-methyl-1-propanol, o-phenylphenol, sodium salt, 1,2-benzisothiazolin-3-one, 2-methyl-4-isothiazolin-3-one (MIT), 5-chloro2-methyland-4-isothiazolin-3-one (CIT), 2-octyl-4-isothiazolin-3-one (OIT), 4,5-dichloro-2-n-octyl-3-isothiazolone, as well as acceptable salts and combinations thereof. Suitable biocides also include biocides that inhibit the growth of mold, mildew, and spores thereof in the coating. Examples of mildewcides include 2-(thiocyanomethylthio)-benzothiazole, 3-iodo-2-propynyl butyl carbamate, 2,4,5,6-tetrachloroisophthalonitrile, 2-(4-thiazolyl)benzimidazole, 2-N-octyl4-isothiazolin-3-one, diiodomethyl p-tolyl sulfone, as well as acceptable salts and combinations thereof. In certain embodiments, the coating composition contains 1,2-benzisothiazolin-3-one or a salt thereof. Biocides of this type include PROXEL® BD20, commercially available from Arch Chemicals, Inc. The biocide can alternatively be applied as a film to the coating and a commercially available film-forming biocide is Zinc Omadine® commercially available from Arch Chemicals, Inc.

Exemplary co-solvents and humectants include ethylene glycol, propylene glycol, diethylene glycol, and combinations thereof. Exemplary dispersants can include sodium polyacrylates in aqueous solution such as those sold under the DARVAN trademark by R.T. Vanderbilt Co., Norwalk, Conn.

The coating compositions can be used for several applications, including in architectural coatings such as an architectural paint, industrial coatings, or inks, which are further discussed herein. In some examples, the coating compositions can be provided as a paint, such as an aqueous based paint, a semi-gloss paint, or a high gloss paint. Generally, coatings are formed by applying the coating composition as described herein to a surface, and allowing the coating to dry (that is, removal of 95% by weight or greater, such as from 95% to 99% by weight of volatiles) to form a dried coating, such as a film. The surface can be, for example, wood, glass, metal, wood, plastic, asphalt, concrete, ceramic material or another coating layer applied on such a surface. Specific surfaces include wall, PVC pipe, brick, mortar, carpet, granule, pavement, ceiling tile, sport surface, exterior insulation and finish system (EIFS), polyurethane foam surface, polyolefin surface, ethylene-propylene diene monomer (EPDM) surface, roof, vinyl, and another coating surface (in the case of recoating applications).

The coating composition can be applied to a surface by any suitable coating technique, including spraying, rolling, brushing, or spreading. The composition can be applied in a single coat, or in multiple sequential coats (e.g., in two coats or in three coats) as required for a particular application. Generally, the coating composition is allowed to dry under ambient conditions. However, in certain embodiments, the coating composition can be dried, for example, by heating and/or by circulating air over the coating.

The thickness of the resultant coating compositions can vary depending upon the application of the coating. For example, the coating can have a dry thickness of at least 0.5 microns, (e.g., at least 10 microns, at least 15 microns, at least 20 microns, at least 25 microns, at least 30 microns, at least 40 microns, at least 50 microns, at least 60 microns, at least 75 microns, at least 85 microns, at least 100 microns, at least 150 microns, at least 200 microns, at least 250 microns, at least 300 microns, at least 350 microns, at least 400 microns, at least 450 microns, or at least 500 microns. In some instances, the coating compositions has a dry thickness of less than 500 microns (e.g., 450 microns or less, 400 microns or less, 350 microns or less, 300 microns or less, 250 microns or less, 200 microns or less, 150 microns or less, 100 microns or less, 75 microns or less, 50 microns or less, 40 microns or less, 30 microns or less, 25 microns or less, or 20 microns or less. In some embodiments, the coating compositions has a dry thickness of between 0.5 microns and 500 microns, from 0.5 microns to 250 microns, from 0.5 microns to 75 microns, or from 5 microns to 75 microns.

As described herein, the coating compositions when dried, exhibit UV reflectance, visible light reflectance, IR reflectance, or a combination thereof. In some embodiments, the dried coating compositions exhibit UV reflectance at a wavelength from 100 nm to 400 nm of at least 10%, at least 25%, at least 30%, at least 35%, at least 40%, at least 45%, at least 50%, at least 55%, at least 60%, or at least 70% or greater. In some embodiments, the dried coating compositions exhibit UV reflectance at a wavelength from 100 nm to 400 nm of from 10% to 99%, from 10% to 90%, from 10% to 80%, or from 30% to 85%.

In some embodiments, the coating compositions when dried, exhibit IR reflectance at a wavelength from 800 nm to 10 μm (or from 800 to 5 μm) of at least 10%, at least 25%, at least 30%, at least 35%, at least 40%, at least 45%, at least 50%, at least 55%, at least 60%, or at least 70% or greater. In some embodiments, the dried coating compositions exhibit IR reflectance at a wavelength from 800 nm to 10 μm (or from 800 to 5 μm) of from 10% to 99%, from 10% to 90%, from 10% to 80%, or from 30% to 85.

In some embodiments, the coating compositions form wet films having improved opacity. For example, wet films having a thickness of 75 μm, can exhibit a light scattering coefficient of greater than 1 S/mil, or greater than 3 S/mil, and an absorption coefficient of less than 0.02 K, as determined according to BS EN ISO 6504-1. In specific embodiments, the film formed from the paint composition having a thickness of 75 μm can have a contrast ratio of at least 90% (e.g., 91% or greater, 92% or greater, 93% or greater, 94% or greater, 95% or greater, 95% or greater, or greater than 96%). In some embodiments, the coating compositions having improved opacity when dried, exhibit reflectance at a wavelength from 100 nm to 800 nm (or from 100 to 400 nm) of at least 10%, at least 25%, at least 30%, at least 35%, at least 40%, at least 45%, at least 50%, at least 55%, at least 60%, or at least 70% or greater.

Methods of Making the Spheres

Methods of making the coating compositions are described, for example in U.S. Ser. No. 16/126,338 (or PCT/US2018/050168) and Ser. No. 16/126,346 (or PCT/US2018/050175), which are incorporated herein by reference in their entirety.

Briefly, the porous metal oxide spheres can be prepared with the use of a sacrificial polymeric particle. For example, an aqueous colloid dispersion containing sacrificial polymer particles and a metal oxide is prepared, the polymer particles typically being nano-scaled. The aqueous colloidal dispersion is mixed with a continuous oil phase, for instance within a microfluidic device or vibrating nozzle techniques, to produce a water-in-oil emulsion. Emulsion aqueous droplets are prepared, collected and dried to form spheres containing sacrificial polymer particles and metal oxide. The sacrificial polymer particles (e.g., nanoparticles or nanospheres) are then removed, for instance via calcination, to provide spherical metal oxide particles (spheres), typically micron-scaled containing a high degree of porosity and pores typically nano-scaled. The porous metal oxide spheres may contain uniform pore diameters, a result of the sacrificial polymer particles being spherical and monodisperse. In some cases, the porous metal oxide spheres are sintered, resulting in a continuous solid structure which is thermally and mechanically stable. Suitable sacrificial polymer particles include thermoplastic polymers. For example, sacrificial polymer particles are selected from the group consisting of poly(meth)acrylic acid, poly(meth)acrylates, polystyrenes, polyacrylamides, polyvinyl alcohol, polyvinyl acetate, polyesters, polyurethanes, polyethylene, polypropylene, polylactic acid, polyacrylonitrile, polyvinyl ethers, derivatives thereof, salts thereof, copolymers thereof and combinations thereof. For example, the sacrificial polymer particles are selected from the group consisting of polymethyl methacrylate, polyethyl methacrylate, poly(n-butyl methacrylate), polystyrene, poly(chloro-styrene), poly(alpha-methylstyrene), poly(N-methylolacrylamide), styrene/methyl methacrylate copolymer, polyalkylated acrylate, polyhydroxyl acrylate, polyamino acrylate, polycyanoacrylate, polyfluorinated acrylate, poly(N-methylolacrylamide), polyacrylic acid, polymethacrylic acid, methyl methacrylate/ethyl acrylate/acrylic acid copolymer, styrene/methyl methacrylate/acrylic acid copolymer, polyvinyl acetate, polyvinylpyrrolidone, polyvinylcaprolactone, polyvinylcaprolactam, derivatives thereof, salts thereof, and combinations thereof. The wt/wt (weight/weight) ratio of sacrificial polymer particles to metal oxide can be from 0.1:1 to 10:1.

Sacrificial polymer removal may be performed for example via calcination, pyrolysis or with a solvent (solvent removal). Calcination is performed in some embodiments at temperatures of at least about 200° C., at least about 500° C., at least about 1000° C., from about 200° C. to about 1200° C. or from about 200° C. to about 700° C. The calcining can be for a suitable period, e.g., from about 0.1 hour to about 12 hours or from about 1 hour to about 8.0 hours. In other embodiments, the calcining can be for at least about 0.1 hour, at least about 1 hour, at least about 5 hours or at least about 10 hours.

The spheres derived from the polymer spheres can be prepared from polydisperse polymer particles comprising forming a liquid solution or dispersion of monodisperse polymer particles; forming at least one further liquid solution or dispersion of monodisperse polymer particles; mixing each of the solutions or dispersions together; forming droplets of the mixture; and drying the droplets to provide polymer spheres comprising polydisperse polymer particles. A microwave or an oven can be used for drying the droplets which can be done under vacuum or in the presence of a desiccant or a combination thereof.

In an alternate embodiment, the solutions or dispersions can be mixed together and spray-dried to provide the spheres derived from the polymer spheres.

Methods of Making the Coating Compositions

The polymer binder in the coating compositions can be prepared by any polymerization method known in the art. In some embodiments, the polymer binder can be prepared by a dispersion, a mini-emulsion, or an emulsion polymerization.

Methods of making the coating compositions can include mixing the polymer binder with one or more or the spheres described herein.

Methods for protecting a substrate against UV or IR-radiation are also provided. The method can include applying a UV coating composition or an IR coating composition as described herein to the surface. The surface can be glass, metal, wood, plastic, concrete, vinyl, ceramic material or another coating layer applied on such surface.

By way of non-limiting illustration, examples of certain embodiments of the present disclosure are given below.

EXAMPLES

Example 1: Preparation of UV Protective Coatings

UV protective coatings including clear coatings for wood can be prepared by mixing a sphere having a particle diameter of from 1 to 10 microns, from 1 to 5 microns, or from 1 to 3 microns and voids of from 50 to 400 nm or from 50 to 200 nm with a polymer binder, water, and optionally a defoamer, a pigment dispersant agent, one or multiple rheology modifying polymers, a light stabilizer, a wetting agent, a fungicide/mildewcide agent, an inorganic pigment extender, and an organic or inorganic light absorbing pigment.

It is believed that the spheres in the UV protective coatings will mitigate effects from UV radiation, offering improved coating performance and can be used to replace existing technologies used in UV protective coatings.

Example 2: Preparation of Coatings with Improved Opacity

Coatings having improved opacity such as paints can be prepared by mixing a sphere having a particle diameter of from 1 to 100 microns or from 1 to 10 microns and voids of from 50 to 800 nm, from 50 to 400 nm, or from 50 to 200 nm with a polymer binder, water, and optionally a defoamer, a pigment dispersant agent, one or multiple rheology modifying polymers, a light stabilizer, a wetting agent, a fungicide/mildewcide agent, an inorganic pigment extender, an organic or inorganic light absorbing pigment, and an organic or inorganic light scattering pigment (e.g. $TiO_2$).

It is believed that the light scattering efficiency of the coatings will exceed that of rutile titanium dioxide, which is currently used in coatings for light scattering characteristics.

Example 3: Preparation of IR Protective Coatings

IR protective coatings including can be prepared by mixing a sphere having a particle diameter of 5 microns or greater (such as from 5 microns to 100 microns) and voids of from 400 to 10000 nm or from 400 to 1000 nm with a polymer binder, water, and optionally a defoamer, a pigment dispersant agent, one or multiple rheology modifying polymers, a light stabilizer, a wetting agent, a fungicide/mildewcide agent, an inorganic pigment extender, an organic or inorganic light absorbing pigment, and an organic or inorganic light scattering pigment (e.g. $TiO_2$).

It is believed that the spheres in the IR protective coatings will mitigate effects from IR radiation, preventing heat transfer into the body of the coating and the substrate.

Embodiments of the Coating Compositions

Coating compositions that exhibit UV reflectance, visible light reflectance, IR reflectance, or a combination thereof.

The coating compositions of the preceding embodiment, wherein the coating composition comprises a polymer binder; and a sphere (e.g., microsphere) selected from porous metal oxide spheres (e.g., microspheres) formed from metal oxide particles (e.g., nanoparticles) and having an average porosity of from 0.10 to 0.80 or from 0.10 to 0.90; polymer spheres (e.g., microspheres) formed from a multimodal distribution of polymer particles (e.g., nanoparticles); or mixtures thereof.

The coating compositions of any one of the preceding embodiments, wherein the polymer binder comprises a polymer selected from acrylic homopolymers, styrene-acrylic-based copolymers, styrene-butadiene-based copolymers, styrene-butadiene-styrene block copolymers, vinyl acrylic-based copolymers, ethylene vinyl acetate-based copolymers, polychloroprene, alkyd resin, polyester resins, polyurethane resins, silicone resins, petroleum resins, epoxy resins, or blends thereof.

The coating compositions of any one of the preceding embodiments, wherein the polymer binder is present in an amount of from greater than 0% to 99.9% by weight, from 5% to 99.9% by weight, or from 10% to 95% by weight, based on a dry weight of the coating composition.

The coating compositions of any one of the preceding embodiments, wherein the sphere has an average particle size diameter of 100 microns or less, or from 1 micron to 100 microns.

The coating compositions of any one of the preceding embodiments, wherein the sphere comprises the porous metal oxide spheres.

The coating compositions of any one of the preceding embodiments, wherein the porous metal oxide spheres comprise from 60% to 99.9% by weight metal oxide, based on a total weight of the porous metal oxide spheres.

The coating compositions of any one of the preceding embodiments, wherein the metal oxide is selected from the group consisting of silica, titania, alumina, zirconia, ceria, iron oxides, zinc oxide, and combinations thereof, such as titania or silica.

The coating compositions of any one of the preceding embodiments, wherein the porous metal oxide spheres have an average porosity of from 0.20 to 0.70, from 0.40 to about 0.65, or from 0.45 to about 0.55.

The coating compositions of any one of the preceding embodiments, wherein the porous metal oxide spheres have a multimodal distribution of pore sizes, such as a bimodal distribution of pore sizes.

The coating compositions of any one of the preceding embodiments, wherein the porous metal oxide spheres have an average pore diameter from 50 nm to 10 μm, from 50 nm to 5 μm, from 50 nm to 2.5 μm, or from 50 nm to 1 μm.

The coating compositions of any one of the preceding embodiments, wherein the sphere comprises the polymer spheres.

The coating compositions of any one of the preceding embodiments, wherein the polymer spheres are formed from a multimodal distribution of pore sizes, such as a bimodal distribution of pore sizes.

The coating compositions of any one of the preceding embodiments, wherein the polymer spheres comprise a polymer selected from the group consisting of poly(meth) acrylic acid, poly(meth)acrylates, polystyrenes, polyacrylamides, polyethylene, polypropylene, polylactic acid, polyacrylonitrile, blends thereof, salts thereof, and copolymers thereof.

The coating compositions of any one of the preceding embodiments, wherein the coating composition further comprises one or more pigments or mineral fillers, such as those selected from clay, kaolin, mica, titanium dioxide, talc, natural silica, synthetic silica, natural silicates, synthetic silicates, feldspars, nepheline syenite, wollastonite, diatomite, barite, glass, and calcium carbonate, bentonite, attapulgite, zeolite, or mixtures thereof.

The coating compositions of any one of the preceding embodiments, wherein the sphere and the one or more pigments or mineral fillers are present in the composition from greater than 0% to 90% by weight or from 0.1% to 60% by weight, based on a total weight of the coating composition.

The coating compositions of any one of the preceding embodiments, further comprising a pigment dispersant, an inorganic or organic filler, a pigment extender, an adhesion enhancer, a film forming aid, a defoamer, a thickener, a light stabilizer, a wetting agent, a biocide, a tackifier, or a combination thereof.

The coating compositions of any one of the preceding embodiments, wherein the coating composition is an aqueous composition.

A UV reflective composition formed from a coating composition of any one of the preceding embodiments.

The UV reflective composition of the preceding embodiment, wherein the UV reflective composition exhibits UV reflectance within a wavelength range from 100 nm to 400 nm.

The UV reflective composition of any one of the preceding embodiments, wherein a film formed from the UV reflective composition exhibits UV reflectance at a wavelength from 100 nm to 400 nm of at least 10%, at least 20%, at least 40%, or at least 50%.

The UV reflective composition of any one of the preceding embodiments, comprising a sphere including porous metal oxide spheres formed from metal oxide particles, wherein the sphere has an average particle size diameter of from 1 micron to 10 microns, from 1 micron to 5 microns, or from 1 micron to 3 microns.

The UV reflective composition of any one of the preceding embodiments, wherein the porous metal oxide spheres have an average pore diameter of from 50 nm to 400 nm or from 50 nm to 200 nm.

The UV reflective composition of any one of the preceding embodiments, wherein the porous metal oxide spheres have an average porosity of from 0.10 to 0.90, 0.10 to 0.80, from 0.20 to 0.70, from 0.40 to 0.65, or from 0.45 to 0.55.

The UV reflective composition of any one of the preceding embodiments, comprising porous metal oxide spheres having an average diameter of from 1 micron to 10 microns, from 1 micron to 5 microns, or from 1 micron to 3 microns; an average porosity of from 0.20 to 0.70 or from 0.45 to 0.55; and an average pore diameter of from 50 nm to 400 nm or from 50 nm to 200 nm.

The UV reflective composition of any one of the preceding embodiments, comprising a polymer selected from acrylic homopolymers, styrene-acrylic-based copolymers, styrene-butadiene-based copolymers, styrene-butadiene-styrene copolymers, vinyl acrylic copolymers, ethylene vinyl acetate copolymers, polychloroprene, blends thereof, or copolymers thereof.

The UV reflective composition of any one of the preceding embodiments, further comprising one or more UV absorbers, such as selected from a hydroxy-phenyl-benzotriaziole, a hydroxy-phenyl-triazine, a hydroxyl-benzophenone, an oxanilide, a cyanoacrylate, a malonate and a mixture thereof.

The UV reflective composition of any one of the preceding embodiments, wherein the UV reflective composition is a clear coating.

A coating having improved opacity formed from a coating composition of any one of the preceding embodiments.

The coating having improved opacity of the preceding embodiment, comprising a polymer selected from acrylic homopolymers, styrene-acrylic-based copolymers, styrene-butadiene-based copolymers, styrene-butadiene-styrene copolymers, vinyl acrylic copolymers, ethylene vinyl acetate copolymers, polychloroprene, blends thereof, or copolymers thereof.

The coating having improved opacity of any one of the preceding embodiments, comprising a sphere selected from porous metal oxide spheres formed from metal oxide particles, polymer spheres formed from a multimodal distribution of polymer particles, or a mixture thereof.

The coating having improved opacity of any one of the preceding embodiments, wherein the sphere has an average particle size diameter of 100 microns or less, from 1 micron to 100 microns, or from 1 micron to 10 microns, and an average porosity of from or from 0.40 to 0.65 or from 0.45 to 0.55.

The coating having improved opacity of any one of the preceding embodiments, wherein the sphere includes porous metal oxide spheres having an average pore diameter of from 50 nm to 800 nm or from 50 nm to 400 nm.

The coating having improved opacity of any one of the preceding embodiments, comprising porous metal oxide spheres having an average diameter of from 1 microns to 100 microns or from 0.5 microns to 100 microns; an average porosity of from 0.20 to 0.70 or from 0.45 to 0.55; and an average pore diameter of from 50 nm to 800 nm or from 50 nm to 400 nm.

The coating having improved opacity of any one of the preceding embodiments, wherein the porous metal oxide spheres comprises a metal oxide selected from the group consisting of silica, titania, and combinations thereof.

The coating having improved opacity of any one of the preceding embodiments, wherein the sphere is present in an amount of from 5% to 90% by weight or from 5% to 80% by weight of the paint composition.

The coating having improved opacity of any one of the preceding embodiments, wherein a wet film formed from the coating having a thickness of 75 μm, exhibits a light scattering coefficient of greater than 1 S/mil or greater than 3 S/mil, and an absorption coefficient of less than 0.02 K, as determined according to BS EN ISO 6504-1.

The coating having improved opacity of any one of the preceding embodiments, wherein a film formed from the paint composition having a thickness of 75 μm has a contrast ratio of at least 90% or greater than 96%.

The coating having improved opacity of any one of the preceding embodiments, wherein the coating is a paint composition.

The coating having improved opacity of any one of the preceding embodiments, wherein the paint composition is selected from an aqueous based paint or an oil based paint, such as selected from an industrial paint or an architectural paint for interior and exterior applications.

An IR reflective composition formed from a coating composition of any one of the preceding embodiments.

The IR reflective composition of the preceding embodiment, wherein the IR reflective composition exhibits IR reflectance within a wavelength range from 800 nm to 10 μm, from 800 nm to 2.5 microns, or from 800 nm to 1 micron.

The IR reflective composition of any one of the preceding embodiments, wherein a film formed from the IR reflective composition exhibits IR reflectance at a wavelength from 800 nm to 10 μm of at least 10%, at least 20%, at least 40%, or at least 50%.

The IR reflective composition of any one of the preceding embodiments, comprising a sphere selected from porous metal oxide spheres formed from metal oxide particles, polymer spheres formed from a multimodal distribution of polymer particles, or a mixture thereof.

The IR reflective composition of any one of the preceding embodiments, comprising a sphere including porous metal oxide spheres formed from metal oxide particles, wherein the sphere has an average particle size diameter of from 5 microns or greater or from 5 microns to 100 microns.

The IR reflective composition of any one of the preceding embodiments, wherein the porous metal oxide spheres have an average pore diameter from 400 nm to 10 microns, from 400 nm to 5 microns, from 400 nm to 2.5 microns, from 400 nm to 1 micron, or from 400 nm to 700 nm.

The IR reflective composition of any one of the preceding embodiments, wherein the porous metal oxide spheres have an average porosity of from 0.10 to 0.90, from 0.10 to 0.80, from 0.20 to 0.70, from 0.40 to 0.65, or from 0.45 to 0.55.

The IR reflective composition of any one of the preceding embodiments, comprising porous metal oxide spheres having an average diameter of from 5 microns to 100 microns; an average porosity of from 0.20 to 0.70 or from 0.45 to 0.55; and an average pore diameter of from 400 nm to 5 microns, from 400 nm to 2.5 microns, or from 400 nm to 1 micron.

The IR reflective composition of any one of the preceding embodiments, comprising a polymer selected from acrylic homopolymers, styrene-acrylic-based copolymers, styrene-butadiene-based copolymers, styrene-butadiene-styrene copolymers, vinyl acrylic copolymers, ethylene vinyl acetate copolymers, polychloroprene, blends thereof, or copolymers thereof.

The IR reflective composition of any one of the preceding embodiments, wherein the IR reflective composition is an architectural coating, or a paint or an ink.

A coating or film obtained by applying a composition according to any one of the preceding embodiments on a substrate.

The coating or film of any one of the preceding embodiments, having a thickness of from 0.5 to 500 microns, from 5 to 75 microns, or 30 microns or less.

The coating or film of any one of the preceding embodiments, wherein the substrate is an architectural structure, glass, metal, wood, plastic, concrete, vinyl, or ceramic material or another coating layer applied on such a substrate.

Methods for protecting a substrate against IR-radiation, UV-radiation, or a combination thereof comprising applying a coating composition according to any one of the preceding embodiments.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising", and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A coating composition comprising:

a polymer binder; and porous metal oxide spheres formed from metal oxide particles, wherein the coating composition when dried exhibits a UV reflectance within a wavelength from 100 nm to 400 nm; a visible light reflectance within a wavelength of from 400 to 800 nm; an IR reflectance within a wavelength from 800 nm to 10 μm; or a combination thereof, wherein the composition is a UV reflective composition, and the porous metal oxide spheres have an average diameter from 1 micron to 3 microns; an average porosity from 0.45 to 0.55; and an average pore diameter from 50 nm to 400 nm, and wherein the coating composition is an aqueous composition.

2. The coating composition of claim 1, wherein the polymer binder comprises a polymer selected from acrylic homopolymers, styrene-acrylic-based copolymers, styrene-butadiene-based copolymers, styrene-butadiene-styrene block copolymers, vinyl acrylic-based copolymers, ethylene vinyl acetate-based copolymers, polychloroprene, alkyd resin, polyester resins, polyurethane resins, silicone resins, petroleum resins, epoxy resins, or blends thereof.

3. The coating composition of claim 1, wherein the porous metal oxide spheres have a multimodal distribution of pore sizes, or a bimodal distribution of pore sizes.

4. The coating composition of claim 1, wherein the porous metal oxide spheres comprise from 60% to 99.9% by weight metal oxide, based on a total weight of the porous metal oxide spheres.

5. The coating composition of claim 4, wherein the metal oxide is selected from the group consisting of silica, titania, alumina, zirconia, ceria, iron oxides, zinc oxide, and combinations thereof.

6. A film derived from a composition of claim 1, wherein the film exhibits a UV reflectance at a wavelength from 100 nm to 400 nm of at least 20%.

7. The film of claim 6, wherein the film having a thickness of 75 microns, exhibits a contrast ratio of at least 90%.

8. The film of claim 6, wherein the film exhibits an IR reflectance at a wavelength from 800 nm to 1 μm, at least 20%.

9. A clear coating composition comprising:

a polymer selected from acrylic homopolymers, styrene-acrylic-based copolymers, styrene-butadiene-based copolymers, styrene-butadiene-styrene copolymers, vinyl acrylic copolymers, ethylene vinyl acetate copolymers, polychloroprene, blends thereof; and porous metal oxide spheres formed from metal oxide particles, wherein the clear coating composition when dried exhibits a UV reflectance at a wavelength range from 100 nm to 400 nm, wherein the clear coating composition is a UV reflective composition, and the porous metal oxide spheres have an average diameter from 1 micron to 3 microns; an average porosity from 0.45 to 0.55; and an average pore diameter from 50 nm to 400 nm, and wherein the clear coating composition is an aqueous composition.

10. The clear coating composition of claim 9, further comprising one or more UV absorbers, selected from a hydroxy-phenyl-benzotriaziole, a hydroxy-phenyl-triazine, a hydroxyl-benzophenone, an oxanilide, a cyanoacrylate, a malonate, or a mixture thereof.

11. A method for protecting a substrate against UV-radiation, the method comprising applying a clear coating composition according to claim 9 to the substrate.

12. A paint composition comprising:

a polymer selected from acrylic homopolymers, styrene-acrylic-based copolymers, styrene-butadiene-based copolymers, styrene-butadiene-styrene copolymers, vinyl acrylic copolymers, ethylene vinyl acetate copolymers, polychloroprene, blends thereof; and porous metal oxide spheres formed from metal oxide particles, wherein the composition is a UV reflective composition, and the porous metal oxide spheres have an average diameter from 1 micron to 3 microns; an average porosity from 0.45 to 0.55; and an average pore diameter from 50 nm to 400 nm, and wherein the paint composition is an aqueous composition.

13. The paint composition of claim 12, wherein a wet film formed from the paint composition having a thickness of 75 μm, exhibits a light scattering coefficient of greater than 3 S/mil, and an absorption coefficient of less than 0.02 K, as determined according to BS EN ISO 6504-1.

* * * * *